(No Model.)
D. MAXON.
TANK WAGON.
No. 453,358. Patented June 2, 1891.
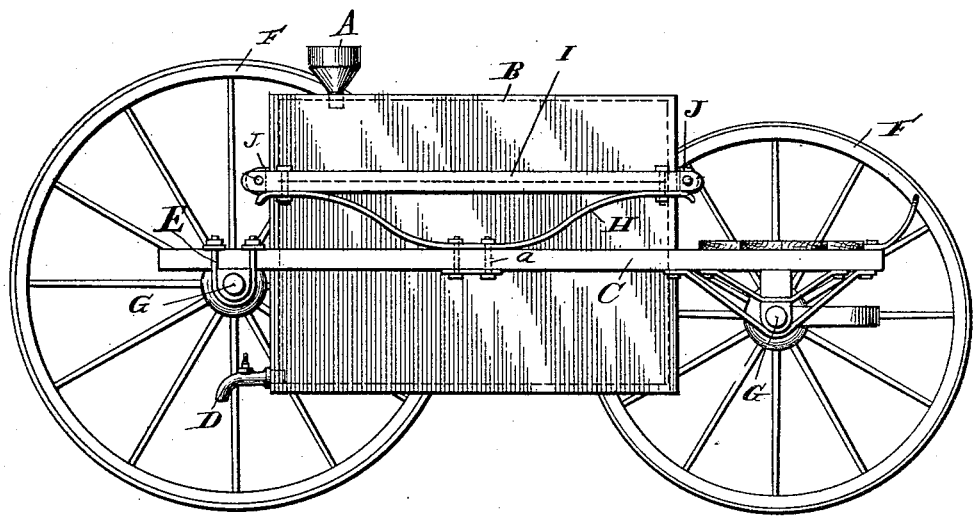
Witnesses:
John Gumm
H. J. Gumm
Inventor:
Dow Maxon

UNITED STATES PATENT OFFICE.

DOW MAXON, OF CEDAR CREEK, WISCONSIN.

TANK-WAGON.

SPECIFICATION forming part of Letters Patent No. 453,358, dated June 2, 1891.

Application filed October 27, 1890. Serial No. 370,825. (No model.)

*To all whom it may concern:*

Be it known that I, DOW MAXON, a citizen of the United States, residing at Cedar Creek, in the county of Washington and State of Wisconsin, have invented certain new and useful Improvements in Tank-Wagons for Gathering Cream; and I do declare the following to be a full, clear, and exact description of the invention, such as will enable others skilled in the art to which it appertains to make and use the same.

My invention relates to improvements in vehicles for transporting tanks or other vessels containing cream or the like; and it has for its objects, among other things, first, to provide a vehicle for the purpose named adapted to so carry the tank containing the cream that jolting of the same will be reduced to the minimum and all danger of churning the cream will be obviated; secondly, to provide a tank adapted to be readily charged and discharged, and, thirdly, to provide a construction of vehicle capable of adjustment to accommodate tanks of various sizes; and to the accomplishment of these and other ends my invention consists in the construction and arrangement of parts hereinafter described, and particularly pointed out in the claim appended.

In the accompanying drawing, the figure is a side elevation of my improved vehicle with the wheels on one side removed.

Referring by letter of designation to the said drawing, F indicates the traveling-wheels of my improved vehicle, which may be of any approved construction, and are mounted on axles G, which are of a length suitable to a vehicle of the character before stated.

Mounted on the axles G, at suitable distances apart, are two longitudinal side bars C, which are preferably connected together adjacent to their forward ends by transverse beams which are pivotally connected in a suitable manner to the front axle, whereby the vehicle may be conveniently turned. The said side bars are also attached to the rear axle by means of double clips, as E, which are adapted to be loosened to allow of an extension of the side bars, whereby tanks or vessels of various lengths may be accommodated between the front and rear axles; but it is obvious that other devices might be employed instead of the double clips to effect the adjustable connection between the side bars and rear axle, although the use of the clips is preferable.

Secured in a suitable manner, as by bolts a, to the side bars C at a suitable point are bow-springs H, the free ends of which are detachably connected in a suitable manner to side strips I, which are preferably of a length slightly greater than the tank which they are designed to be connected to. These side strips I are connected together adjacent to their ends by transverse strips or bars J, which are of a length slightly greater than the width of the tank to which they are connected, and it is obvious that if desired the strips or bars I and J might be of a length capable of adjustment and might be so connected as to render such adjustment convenient, instead of giving place to other strips, when a different-sized tank is to be mounted upon the vehicle.

The tank B, which may be connected to or mounted upon the side and transverse strips in any suitable manner, is designed to rest so that its bottom will be below the axles of the wheels, whereby the cream may be conveniently drawn therefrom.

Connected to the top of the tank B is a funnel A, into which the cream is poured to charge the tank, and adjacent to the bottom of the tank, and preferably on the rear side thereof, is a cock D, which serves to allow a discharge of the contents.

By the construction described and illustrated it will be seen that I have provided a vehicle on which the cream tank or vessel is so mounted between the axles that it will be jolted but very little, if at all, and by the employment of the bow-springs situated as they are, the greater part of the jolting motion will be taken up thereby. Thus it will be seen that the objectionable floats ordinarily used in tanks and barrels for transporting cream to prevent the same from churning may be dispensed with, as by my invention the causes of agitation are removed. It will also be understood that by my invention the tank may be kept much cleaner than where the wooden floats are employed, as such floats often become molded.

Having described my invention, what I claim, and desire to secure by Letters Patent, is—

In a vehicle for transporting cream and the like, the combination, with the front and rear axles and the side bars mounted on said axles and adjustably connected to the rear axle, whereby the distance between the axles may be adjusted, of the bow-springs connected to the said side bars, the side strips detachably connected to said bow-springs adjacent to the ends thereof, the transverse bars or strips connecting the side strips, and the tank or vessel supported by said side and transverse strips, substantially as specified.

DOW MAXON.

In presence of—
 EDWARD VUNK,
 IDA GUMM.